March 30, 1954  F. D. SAWYER ET AL  2,673,439
CROP STRIPPING MEANS
Filed Feb. 11, 1952  2 Sheets-Sheet 1
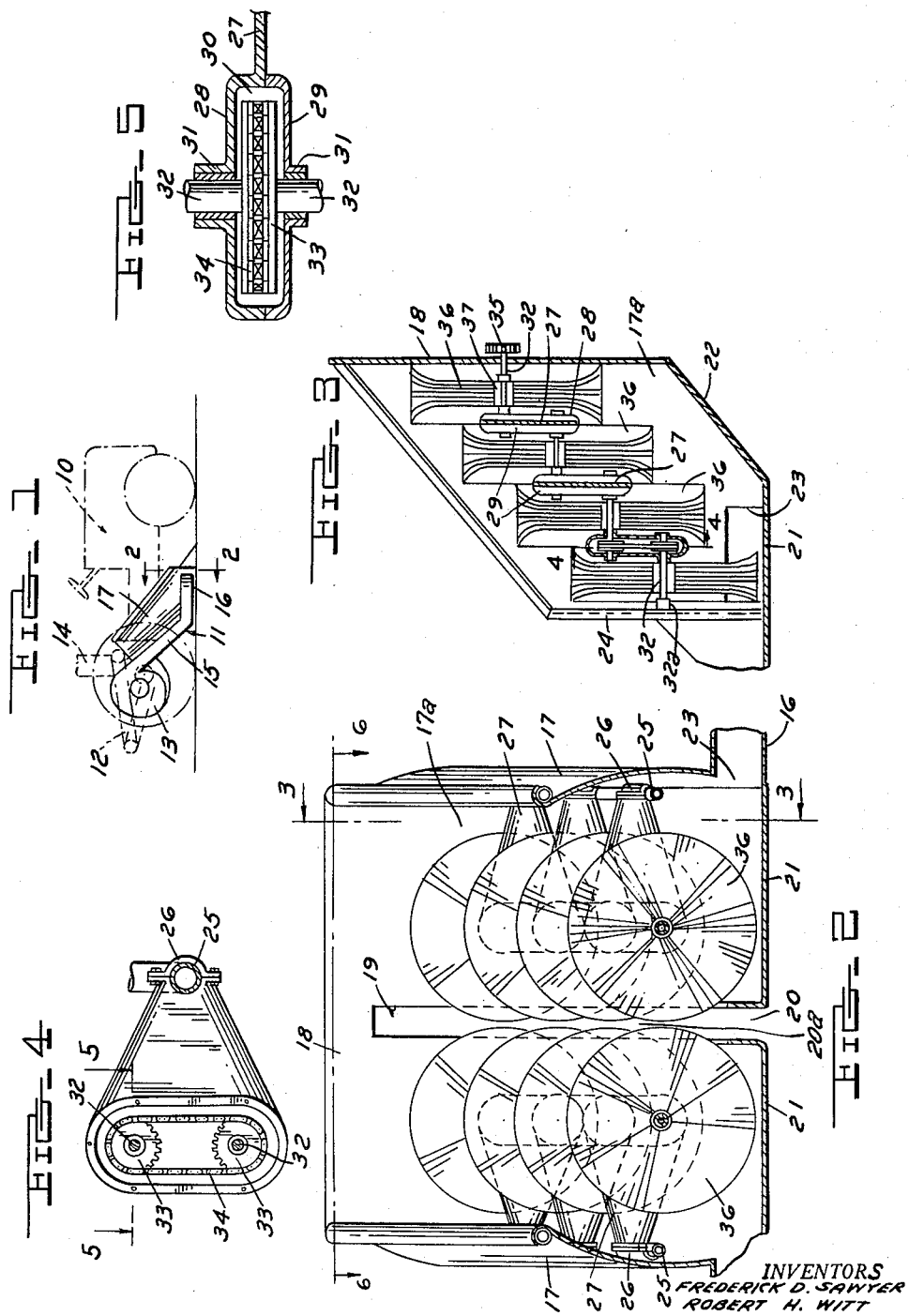
INVENTORS
FREDERICK D. SAWYER
ROBERT H. WITT
BY
*W. A. Schaich*
*H. P. Settle, Jr.*
ATTORNEYS

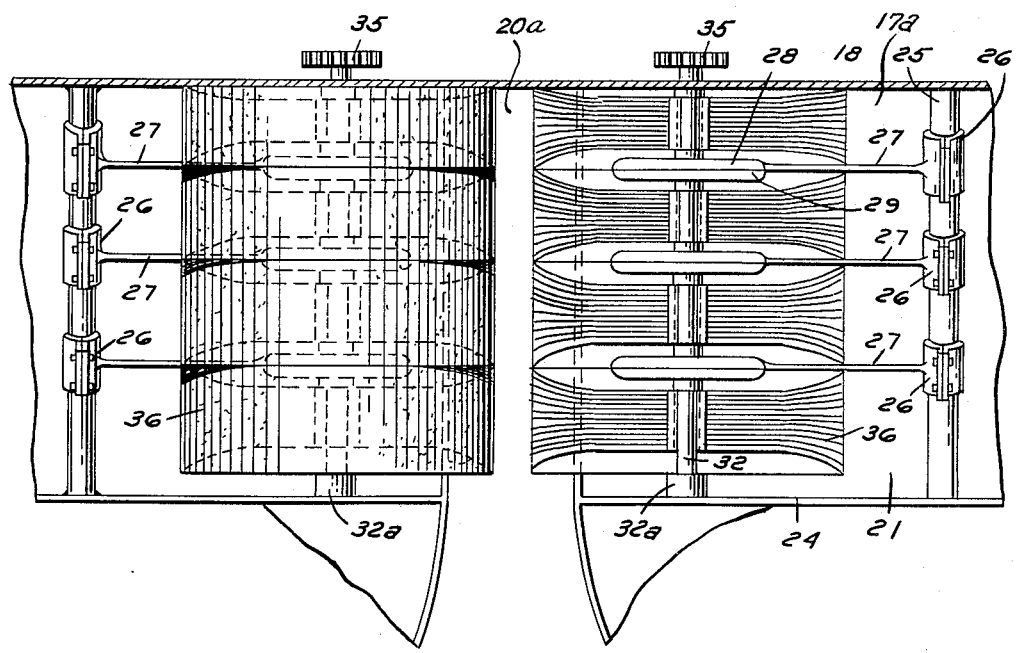

Patented Mar. 30, 1954

2,673,439

UNITED STATES PATENT OFFICE 2,673,439

CROP STRIPPING MEANS

Frederick D. Sawyer, Wayne, and Robert H. Witt, Royal Oak, Mich., assignors, by mesne assignments, to Ford Motor Company, Dearborn, Mich., a corporation of Delaware Application February 11, 1952, Serial No. 270,994

8 Claims. (Cl. 56—33)

The present invention relates to a crop stripping device for a harvesting machine and more particularly to a stripping device wherein the harvesting elements provide an inclined restricted stripping nip.

It has previously been proposed that stripper-type harvesting machines be provided with stripping elements in the form of elongated parallel, upwardly and rearwardly inclined rotating stripping brushes defining therebetween a restricted stripping nip at which the crop is stripped from the associated plant. Certain disadvantages have developed from the adaption of such stripping brushes to high speed mechanical harvesting equipment. For example, the provision of an inclined nip formed by a pair of elongated brushes results in the imparting of forward motion to the crop flung from the brushes by the centrifugal forces generated during brush rotation. Further, the harvesting of a crop from relatively tall plants, such as certain types of cotton plants, has required the use of excessively long, unduly expensive brushes because the degree of brush inclination must be held to a minimum due to the aforesaid longitudinal throwing of the crop therefrom.

The present invention now provides an improved crop stripping device effective to provide a vertically extending stripping nip and to centrifugally fling cotton or a similar crop therefrom only in a substantially transverse plane so that longitudinal throwing of the crop is eliminated.

In general, the present invention proposes the provision of a plurality of individual brushes having parallel axes of rotation vertically displaced from one another, so that the brushes in combination define an inclined exterior stripping surface. The individual relatively short brushes are so disposed that the brush driving means for each brush is positioned between pairs of adjacent brushes, with the inherent tendency of the brush to flare axially during use being utilized to overlap the brush driving means, thereby providing a substantially continuous brush surface. Preferably, the rotational axes of the individual brushes are aligned with the direction of travel of the harvesting machine, so that the crop is flung centrifugally from the brushes in a direction transverse to the direction of machine travel and without any undesirable longitudinal travel of the crop. The stripping nip is provided by the transverse spacing of a pair of sets of brushes cooperably defining a restricted nip space therebetween.

It is, therefore, an important object of the present invention to provide an improved crop stripping device for a harvesting machine having an inclined brush surface from which the crop is centrifugally flung transversely to the direction of machine travel.

Another important object is the provision of a stripping device wherein an inclined stripping nip is provided by laterally spaced sets of brushes vertically and longitudinally offset from one another for rotation about axes parallel to the direction of machine travel.

It is a further object to provide a crop-stripping brush construction composed of individual, vertically offset and longitudinally aligned brush sections cooperatively defining a smooth exterior brushing surface from which the stripped crop is flung in a radial direction.

Still another important object is the provision of an improved cotton harvesting machine provided with stripping elements defining an inclined stripping nip and composed of individual vertically spaced and longitudinally aligned brush sections individually driven by means interposed between the individual sections and covered by the brushes when in operative condition.

The specific nature of this invention, as well as other objects and advantages thereof, will become apparent to those skilled in the art from the following detailed description, taken in conjunction with the two sheets of drawings on which, by way of preferred example only, are illustrated one embodiment of this invention.

On the drawings:

Figure 1 is a somewhat schematic side elevational view of a harvesting machine provided with a crop stripping device of the present invention;

Figure 2 is a greatly enlarged sectional view taken along the plane 2—2 of Figure 1;

Figure 3 is a sectional view, with parts shown in elevation, taken along the plane 3—3 of Figure 2;

Figure 4 is an enlarged sectional view, with parts shown in elevation, taken along the plane 4—4 of Figure 3;

Figure 5 is an enlarged sectional view, with parts shown in elevation, taken along the plane 5—5 of Figure 4; and Figure 6 is an enlarged fragmentary sectional view taken along the plane 6—6 of Figure 2.

As shown on the drawings:

In Figure 1 reference numeral 10 refers generally to a tractor shown in dotted outline and having mounted thereon a harvesting machine 11 provided with a crop stripping device of the present invention. The harvesting machine 11 includes a frame 12 secured to the tractor and carrying an air impeller 13 driven by the tractor and having its discharge side connected to a discharge conduit 14 extending upwardly and rearwardly of the remainder of the machine to deposit a harvested crop in a wagon or other portable receptacle. The intake side of the impeller 13 is vented through an intake conduit 15 to a suction pickup 16. The crop stripping elements are closed within a forwardly extending flare sheet or shield 17 extending into proximity with the ground and generally overlying the suction intake 16. The construction of the harvesting machine and the crop conveying portion thereof is more fully described in the copending application of Robert H. Witt, Serial No. 240,565, filed August 6, 1951, now abandoned, and assigned to the assignee of the present invention. Reference may be made to this copending application for details of construction and function of the harvesting machine.

As best seen in Figures 2, 3 and 5, the stripping elements of the machine 11 are enclosed within the flare sheets 17 which are connected by an upstanding, transversely extending rear wall 18 having an open bottomed slot 19 therein aligned with a similar slot 20 between sheet metal floor sections 21 joined to the rear wall 18 at the lower edge thereof and having upwardly and rearwardly sloping rear portions 22. The flare sheets 17 inclose a stripping zone 17a therebetween, and the flare sheets are provided adjacent the lower forward corners thereof with generally rectangular openings 23 providing communication with the suction intake 16 of the impeller 13, and it will be appreciated that cotton or a similar harvested crop collecting upon the floor 21 within the stripping zone 17a will be subjected to suction through the intake 16 to convey the cotton rearwardly and upwardly to the impeller 13 for subsequent delivery to the receptacle provided therefor.

Extending parallel to and along substantially the length of each of the flare sheets 17 at the inner sides thereof are upwardly and rearwardly inclined support rods or side rails 25 fixedly secured at their rear ends to the rear wall 18 and at their forward ends to the pipe support 24 for the flare sheets. The supporting rods 25 carry split sleeve-type brackets 26 securely clamped thereto at spaced points along the length thereof and provided with supporting brackets 27 integrally formed with the collars and projecting inwardly from the flare sheets. The brackets 27 are integrally formed with a concavo-convex casing half 28 at the free inner ends thereof. The casing halves 28 are each bolted or otherwise secured to a mating casing half 29, the halves cooperating to define therebetween an interior space 30. The casing halves 28 and 29 also are provided with oppositely projecting, vertically spaced bosses 31 in which are journaled stub shafts 32 carrying sprockets 33 keyed or otherwise fixedly secured thereto within the space 30. In Figures 3 and 4, it will be seen that a pair of vertically spaced shafts 32 are journaled by the casing halves mounted upon each bracket 27, and these sprockets are lapped by sprocket chains 34, so that the shafts are driven in the same direction upon the rotation of either of the shafts. The uppermost of the shafts 32 projects rearwardly through the rear wall 18 and carries a sprocket or drive gear 35 thereon for connection by suitable means to the source of power for the impeller 13, and the lowest of the shafts 32 projects forwardly with the free end thereof being received by a bearing 32a mounted on the support 24.

Each of the shafts 32 intermediate adjacent housings 28—29, carries a generally cylindrical brush 36 comprising a plurality of radially extending bristles mounted upon a generally cylindrical hub 37 keyed or otherwise secured to the associated shaft 32 for turning movement therewith. It will be seen that the sprockets 33 and the chains 34 interconnect the brushes 36, so that the driving of the uppermost shaft 32 through the drive means 35 will effect rotation of all the brushes 36 at the same speed and in the same direction. The gear casings defined by the casing halves 28—29 are of smooth outer contour, and the inherent tendency of the brushes to fan outwardly at their outer ends will cause sufficient overlapping of the brushes as illustrated in Figure 3 to cover the gear casings and to present a smooth outer brush contour, as shown in Figure 6. The shafts 32 are parallel to one another and extend axially along the path of movement of the harvesting machine 11. The brushes are vertically displaced upwardly and rearwardly, and the brushes define, in cooperation with an identical set of brushes on the other side of the slot 19, an upwardly and rearwardly inclined stripping nip 20a overlying the slot 20 between the floor sections 21 and longitudinally aligned with the slot 19. Inasmuch as the brush bristles are resiliently deformable, any interference between the bristles of adjacent bristles will cause no interruption of the brush drive nor any loss of stripping efficiency, particularly since the adjacent brushes are driven in the same direction and at the same rotational speed.

Since the axis of rotation of each of the brushes is parallel to and aligned with the direction of travel of the machine, the brushes will centrifugally fling cotton stripped at the nip radially outwardly in a direction normal to the direction of travel, i. e., directed toward the flare sheets 17 without any forward travel component, as is the case with vertically inclined brushes as heretofore employed. The shafts 32 for the two sets of brushes are counterrotated so as to obtain an efficient stripping action at the stripping nip. The cotton so flung from the brushes will fall by gravity upon the floor section 21 or the inclined portion 22 thereof, so as to be subjected to suction in the suction inlet 16, and the cotton will be conveyed by the impeller to a suitable receptacle as hereinbefore described.

The advantages residing in the present invention will be obvious to those skilled in the art and include the provision of a substantial vertically extending nip without the necessity of employing expensive cylindrical brushes of excessive length, as heretofore employed, the accurate centrifugal flinging of the stripped crop in a transverse direction without a forward component tending to fling the cotton from the machine, the employment of separate and inexpensive brush sections, any one of which may be replaced when worn, and any combination of which may be utilized for the harvesting of cotton from only a selected vertical portion of the cotton plant, as where the harvesting is done by successive stripping operations during a single growing season, and the overlapping of the brushes to cover the drive housings so as to provide a continuous brushing surface while utilizing a simple drive arrangement.

We claim:

1. In a crop stripping means including a harvesting head having a supporting frame and flare sheets enclosing a stripping zone and means for elevating the stripped crop from said zone to a receptacle, a pair of laterally spaced stripping elements in said zone defining a restricted upwardly and rearwardly inclined stripping nip therebetween, said elements each comprising a plurality of individual brush sections, generally horizontal shafts upon which said brushes are disposed in longitudinally aligned and vertically offset relation with respect to one another, driving means interposed between the individual brushes of each of said elements to rotate the same, and individual brackets secured to said frame to respectively support said shafts for rotation.

2. In a cotton stripper, an improved stripping element comprising longitudinally spaced support members, a longitudinally extending supporting element joining said members, laterally extending brackets spaced along said element, longitudinally aligned and vertically offset individual shafts journaled by said brackets and extending therebetween, and a brush section mounted on each of said shafts for rotation therewith, said brush sections being flared outwardly upon rotation thereof to overlap the brackets therebetween to present a smooth peripheral stripping surface.

3. A stripping head for a harvester comprising longitudinally spaced supporting elements, laterally spaced upwardly and rearwardly inclined supporting members joining said elements, a plurality of spaced laterally extending brackets on each of said members, said brackets projecting laterally inwardly to lie between said members with the inner ends of the brackets of one member being spaced from the corresponding brackets on the other member, a set of vertically spaced rotatable shafts journaled by each of said brackets to extend therebetween in longitudinal alignment, each of said brackets receiving a pair of vertically spaced shafts and the free ends of the terminal shafts being journaled by the adjacent one of said elements, means for rotating a terminal shaft of each set of shafts, drive means joining longitudinally adjacent shafts for co-rotation, and a brush section on each of said shafts for rotation therewith, the brush sections on each set of shafts cooperably defining a peripheral stripping surface from which a stripped crop is centrifugally thrown in a lateral direction and the sets of brush sections cooperably defining a stripping nip therebetween.

4. In a crop stripping head, a plurality of vertically offset longitudinally aligned rotatable shafts, the terminal ends of adjacent shafts being vertically aligned, laterally extending support brackets each journaling the terminal ends of a pair of adjacent shafts and having enlarged housing portions enclosing the same, drive means joining said pairs of shafts and enclosed within said housing portions, and a brush section mounted on each of said shafts and having resilient bristles adapted to flare axially of said shafts during use to overlap said brackets and the housing portions thereof to present a smooth peripheral stripping surface.

5. In a crop stripping mechanism, a crop gathering head including a pair of side rails, means defining a vertically extending stripping nip intermediate said side rails comprising a pair of sets of vertically offset longitudinally aligned individual stripping sections rotatable about parallel generally horizontal axes, said sets of sections being laterally spaced to cooperably define a restricted stripping nip therebetween, and individual brackets respectively mounting each of said sections on said side rails.

6. In a crop stripping mechanism, a crop gathering head including a pair of side rails, means defining a vertically extending stripping nip intermediate said side rails comprising a pair of sets of vertically offset longitudinally aligned individual stripping brushes rotatable about parallel generally horizontal axes, said sets of brushes being laterally spaced to cooperably define a restricted stripping nip therebetween, means for rotating the brushes of each of said sets respectively in the same direction with the sets of brushes being respectively rotated in opposite directions to obtain an effective nip action, and individual brackets respectively mounting each of said sections on said side rails.

7. In a crop stripping means including a harvesting head having flare sheets enclosing a stripping zone, laterally spaced side rails disposed in said zone, and means for elevating a stripped crop from the zone to a receptacle, stripping elements mounted in said zone to define a stripping nip comprising individual brackets carried by said side rails, respectively, and projecting laterally inwardly therefrom, a pair of sets of individual generally horizontal shafts longitudinally aligned and vertically offset relative to one another the laterally inner portions of said brackets respectively journaling said shafts for rotation, means for co-rotating each of said shafts of each set with the shafts of one set of shafts being counterrotated with respect to the shafts of the other of said sets, and an individual brush section respectively mounted on each of said shafts for rotation therewith, the brush sections of each set of shafts having their peripheries closely spaced transversely to define a restricted and inclined stripping nip therebetween, and said brush sections serving to convey a stripped crop from said nip to said elevating means.

8. In a cotton stripping head having a supporting frame, a pair of laterally spaced counterrotating stripping units defining a longitudinally extending stripping nip therebetween for the reception of cotton plants, said units each comprising a plurality of individual bristle brushes of relatively short axial dimension, a separate shaft extending axially of each brush and projecting therebeyond, support means carried by said frame and journaling the free terminal ends of said shafts, secondary drive means joining the terminal ends of said shafts for jointly driving the shafts of each unit, and primary drive means for rotating one shaft of each unit.

FREDERICK D. SAWYER.
ROBERT H. WITT.

References Cited in the file of this patent

UNITED STATES PATENTS

| Number | Name | Date |
|---|---|---|
| 1,301,006 | Prior | Apr. 15, 1919 |
| 1,722,747 | Hentz | July 30, 1929 |